United States Patent
Ohrbom et al.

(10) Patent No.: US 6,710,138 B2
(45) Date of Patent: Mar. 23, 2004

(54) CARBAMATE FUNCTIONAL POLYMERS AND OLIGOMERS

(75) Inventors: Walter H Ohrbom, Hartland Township, MI (US); John W. Rehfuss, Huntersville, NC (US)

(73) Assignee: BASF Corporation, Southfield, MA (US)

( * ) Notice: Subject to any disclaimer, the term of this patent is extended or adjusted under 35 U.S.C. 154(b) by 0 days.

(21) Appl. No.: 10/342,897

(22) Filed: Jan. 15, 2003

(65) Prior Publication Data

US 2003/0144429 A1 Jul. 31, 2003

Related U.S. Application Data

(62) Division of application No. 09/731,328, filed on Dec. 6, 2000, now Pat. No. 6,541,577.

(51) Int. Cl.$^7$ .......................... C08F 8/30; C08K 5/205; C09D 201/02; C09D 7/00
(52) U.S. Cl. .................. 525/498; 525/329.9; 525/330.5
(58) Field of Search .............................. 525/498, 329.9, 525/330.5

(56) References Cited

U.S. PATENT DOCUMENTS

| | | | |
|---|---|---|---|
| 2,979,514 A | 4/1961 | O'Brien et al. .......... 260/340.2 |
| 3,479,328 A | 11/1969 | Nordstrom .................. 260/86.1 |
| 3,674,838 A | 7/1972 | Nordstrom .................. 260/482 |
| 4,126,747 A | 11/1978 | Cowherd, III et al. | |
| 4,279,833 A | 7/1981 | Culbertson et al. | |
| 4,340,497 A | 7/1982 | Knopf | |
| 4,814,382 A | 3/1989 | Hoy et al. | |
| 4,977,231 A | 12/1990 | McVay et al. | |
| 5,115,015 A | 5/1992 | Richey, Jr. et al. | |
| 5,158,808 A | 10/1992 | Hoy et al. | |
| 5,336,566 A | 8/1994 | Rehfuss | |
| 5,512,639 A | 4/1996 | Rehfuss et al. | |
| 5,552,497 A | 9/1996 | Taylor et al. | |
| 5,593,733 A | 1/1997 | Mayo | |
| 5,646,214 A | 7/1997 | Mayo | |
| 5,714,549 A | 2/1998 | Wu et al. | |
| 5,719,237 A | 2/1998 | Rehfuss et al. | |
| 5,726,254 A | 3/1998 | Wu et al. | |
| 5,744,550 A | 4/1998 | Menovcik et al. | |
| 5,872,195 A | * | 2/1999 | Green et al. ................. 525/481 |
| 6,362,285 B1 | * | 3/2002 | Ohrbom et al. .......... 525/330.5 |

FOREIGN PATENT DOCUMENTS

| CA | 1295767 | 2/1992 | ............ C09D/7/12 |
|---|---|---|---|
| DE | 198 24 656 A1 | 12/1998 | ......... C07C/271/18 |
| EP | WO 87/00851 | 2/1987 | ............ C09D/7/12 |
| EP | WO 88/02766 | 4/1988 | ............ C09D/7/00 |
| EP | WO 99/33915 | 7/1999 | ............ C08L/33/14 |

OTHER PUBLICATIONS

08/333,804, Filed Nov. 3, 1994, Walter Ohrbom, Curable coating compositions containing carbamte resin And additives, pp. 1–27. Patent 6,165,618.

* cited by examiner

Primary Examiner—Rabon Sergent
Assistant Examiner—Olga Asinovsky
(74) Attorney, Agent, or Firm—Mary E. Golota

(57) ABSTRACT

The instant invention provides carbamate functional polymers and/or oligomers and coating compositions containing such which have improved levels of nonvolatile solids yet demonstrate good sprayability and etch resistance. The carbamate functional polymers and/or oligomers of the invention comprise the polymerization reaction product of (a) a polymer or oligomer comprising a plurality of functional groups reactive with an active hydrogen group, and (b) a monomeric compound of the formula:

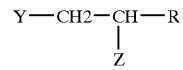

wherein at least one of Y and Z is an active hydrogen containing group and the other is a primary carbamate group, and R is of the formula: —(L)n—R' wherein L is a linking group of one or more carbons containing heteroatoms selected from the group consisting of O, N, and mixtures thereof, R' is an alkyl group free of heteroatoms and selected from the group consisting of branched alkyl groups having from 5 to 30 carbons, straight chain alkyl groups of more than 2 carbons, and mixtures thereof, and n is a number from 0 to 1.

2 Claims, No Drawings

CARBAMATE FUNCTIONAL POLYMERS AND OLIGOMERS

The present application is a divisional application of U.S. Ser. No. 09/731,328, filed on Dec. 6, 2000, now U.S. Pat. No. 6,541,577, which is incorporated herein by reference.

FIELD OF THE INVENTION

The invention relates to carbamate functional polymers and/or oligomers, and curable coating compositions containing the same. The curable coating compositions of the invention are particularly useful in composite color-plus-clear coating systems.

BACKGROUND OF THE INVENTION

Curable coating compositions such as thermoset coatings are widely used in the coatings art. They are often used as topcoats in the automotive and industrial coatings industry. Color-plus-clear composite coatings are particularly useful as topcoats where exceptional gloss, depth of color, distinctness of image, or special metallic effects are desired. The automotive industry has made extensive use of these coatings for automotive body panels. Color-plus-clear composite coatings, however, require an extremely high degree of clarity in the clearcoat to achieve the desired visual effect. High-gloss coatings also require a low degree of visual aberations at the surface of the coating in order to achieve the desired visual effect such as high distinctness of image (DOI).

As such, these coatings are especially susceptible to a phenomenon known as environmental etch. Environmental etch manifests itself as spots or marks on or in the finish of the coating that often cannot be rubbed out.

It is often difficult to predict the degree of resistance to environmental etch that a high gloss or color-plus-clear composite coating will exhibit. Many coating compositions known for their durability and/or weatherability when used in exterior paints, such as high-solids enamels, do not provide the desired level of resistance to environmental etch when used in high gloss coatings such as the clearcoat of a color-plus-clear composite coating.

Many compositions have been proposed for use as the clearcoat of a color-plus-clear composite coating, such as polyurethanes, acid-epoxy systems and the like. However, many prior art systems suffer from disadvantages such as coatability problems, compatibility problems with the pigmented basecoat, solubility problems. Moreover, very few one-pack coating compositions have been found that provide satisfactory resistance to environmental etch, especially in the demanding environment of automotive coatings.

It has been found that carbamate functional polymers such as those described in U.S. Pat. No. 5,356,669 can be used to provide coating compositions which exhibit significantly improved environmental etch resistance. Carbamate functional polymers have been used to provide commercially advantageous coatings compositions, especially as clearcoats in composite color-plus-clear coatings.

However, although coating compositions containing carbamate functional polymers generally provide the performance properties currently required by the automotive industry, continuous improvement is always desired. In particular, it would be advantageous to increase the percent nonvolatile solids (%NV) of curable coating compositions containing carbamate functional polymers. Increasing the %NV of a coating composition provides a competitive advantage with respect to environmental concerns, air permiting requirements and cost. Curable coating compositions having ever increasing %NVs are greatly desired by the automotive manufacturing industry. However, neither sprayability nor applied appearance may be affected by decreases in the volatile organic content (VOC). At the same time, such improvements must be achieved without any decrease in environmental etch resistance or other commercially required performance property.

Accordingly, it is an object of the instant invention to provide curable coating compositions which provide all of the advantages of prior art carbamate containing coating compositions, especially good environmental etch resistance, but further exhibit increased %NV (nonvolatile) or decreased VOC (volatile organic content) at a sprayable viscosity and desireable applied appearance.

SUMMARY OF THE INVENTION

It has unexpectedly been found that these and other objects of the invention can be achieved with the use of a particular carbamate functional polymer which is the polymerization reaction product of (a) a polymer or oligomer comprising a plurality of functional groups reactive with an active hydrogen group, and (b) a monomeric compound of the formula:

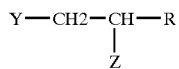

wherein at least one of Y and Z is an active hydrogen containing group and the other is a primary carbamate group, and R is of the formula: $-(L)_n-R'$ wherein L is a linking group of one or more carbons containing heteratoms selected from the group consisting of O, N, and mixtures thereof, R' is an alkyl group free of heteratoms and selected from the group consisting of branched alkyl groups having from 5 to 30 carbons, straight chain alkyl groups of more than 2 carbons, and mixtures thereof, and n is a number from 0 to 1.

The invention further provides curable coating compositions which comprise the particular carbamate functional resins of the instant invention.

DETAILED DESCRIPTION OF THE PREFERRED EMBODIMENT

The advantages of the instant invention derive from the use of a particular carbamate functional polymer or oligomer.

For the purposes of the instant invention, the term "polymer" refers to compounds having number average molecular weights in the range of from 1500 to over 1,00,000 Daltons, while "oligomer" refers to compounds having number average molecular weights in the range of from 200 to 1499 Daltons. The terms "polymeric compound" and "polymeric compounds" as used herein are meant to encompass both "polymer" and "oligomer" as defined above. Moreover, the term "polymeric compounds" as used herein may be used in regards to the particularly claimed carbamate functional polymers and oligomers of the instant invention as well as to the polymer or oligomer (a) used as a reactant in the polymerization reaction which produces the particular carbamate functional polymers or oligomers of the invention.

The carbamate functional polymeric compounds of the invention are the reaction product of a polymer or oligomer (a) which comprises a plurality of functional groups reactive with an active hydrogen group, and a monomeric compound (b) of the formula:

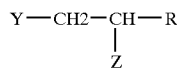

wherein Y and Z are selected from the group consisting of an active hydrogen containing group and a primary carbamate group, and may not be the same; R is of the formula: —(L)$_n$—R' wherein L is a linking group of one or more carbons containing heteratoms selected from the group consisting of O, N, and mixtures thereof; R' is an alkyl group free of heteratoms and selected from the group consisting of branched alkyl groups having from 5 to 30 carbons, straight chain alkyl groups of more than 2 carbons, and mixtures thereof; and n is a number from 0 to 1.

The polymeric compound (a) may generally be any compound of the appropriate molecular weight which has a plurality of the appropriate functional groups (i) discussed below. When the carbamate functional polymeric compound is an oligomer, it will generally have a number average molecular weight in the range of from 200 to 1499 Daltons. When the carbamate functional polymeric compound of the invention is a polymer, it will have a number average molecular weight in the range of 1500 Daltons to over 1,000,000 Daltons, preferably between 1500 and 50,000 Daltons, most preferably between 1500 and 15,000 Daltons.

Polymeric compound (a) may be acrylic, modified acrylic, polyurethane, polyester, polyurea, alkyd, polysiloxane, polyethers, epoxy upgrades, mixtures thereof, and the like. Preferably, the polymeric compound (a) will be polyurethane, polyester, acrylics, or the like. Most preferably, the polymeric compound (a) will be polyurethane, especially an isocyanate functional polyurethane polymer or urethane oligomer.

Suitable polymeric compounds (a) must comprise a plurality of functional groups (i) which are reactive with an active hydrogen group. "Active hydrogen group" as used herein refers to functional groups which donate a hydrogen group during the reaction with the functional groups of compounds (a). Examples of active hydrogen groups are carbamate groups, hydroxyl groups, amino groups, thiol groups, acid groups, hydrazine groups, activated methylene groups, and the like.

Illustrative examples of functional groups (i) which react with active hydrogen groups are isocyanate groups, cyclic anhydride groups, epoxy groups, silanes, cyclic carbonate groups, mixtures thereof, and the like. In a special case, where the reaction involves a condensation reaction (such as esterification) acid and hydroxy groups can also be used as groups reactable with active hydrogen groups. Preferred groups for use as functional groups (i) of polymeric compound (a) are isocyanate groups, cyclic anhydride groups, epoxy groups, cyclic carbonate groups, and mixtures thereof. Most preferably, the plurality of functional groups (i) of polymeric compound (a) will be isocyanate groups.

In one embodiment of the invention, the polymer or oligomer (a) maybe an acrylic. The acrylic polymer preferably has a molecular weight of 1000 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, styrene, maleic anhydride, and the like. The required functional group (i), e.g., isocyanate, or epoxy, cyclic carbonate, anhydride can be incorporated into the ester portion of the acrylic monomer. For example, isocyanate functional acrylic monomers that can be used to form such polymers include isocyanato ethyl methacrylate, 3-isopropenyl-α, α-dimethylbenzyl isocyanate, glycidyl methacrylate, (2-oxo-1,3-dioxolan-4-yl)methyl methacrylate, and the like. Other acrylic monomers having functional groups (i) in the ester portion of the monomer are also within the skill of the art.

Modified acrylics having the required functional groups (i) can also be used as the polymeric compound (a) according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference. A non-limiting example of one such polymer is an acrylic resin made up of hydroxyethyl methacrylate, methyl methacrylate, and butyl acrylate which is then half capped with a diisocyanate such as isophorone diisocyanate to make an isocyanate functional polymer (a).

Polyesters and ester oligomers having functional groups (i) such as isocyanate, or epoxy, cyclic carbonate, anhydried can also be used as the polymeric compound (a) in the composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, 1,6-hexanediol, neopentyl glycol).

The polyesters, formed as described above, will generally have either hydroxy, acid or a mixture of both functionalities. These functionalities can be used for a condensation reaction with monomer (b), or they can be converted into other functionalities which may then react with monomer (b). For example, a hydroxy functional polyester may be reacted with a diisocyanate to form an isocyanate functional polyester. The reaction of this material with glycidol will form an epoxy functional polyester with internal urethane links with can then be reacted with monomer (b).

Other functional polyesters can be formed though the use of specialty capping alcohols and acids that are added during the polyester formation. For example, the addition of a hydroxy alkene followed by reaction with peroxide will result in the placement of an epoxy group on the polyester. Reaction of this epoxy polyester with carbon dioxide will result in the formation of a cyclic carbonate polyester. In a likewise manner as described above, acid or hydroxy functional ester oligomers can be converted into ester oligomers possessing groups reactable with the active hydrogen group of monomer (b).

Polyurethanes and urethane oligomers having required functional groups (i) are also known in the art. They can be prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). Formulating with an appropriate amount of excess polyisocyanate will result in the polyurethane having free isocyanate functionality. Use of glycidol, or 3-hydroxypropylene carbonate, for example, will functionalize the polyurethane with epoxy or cyclic carbonate groups respectively. As described above, epoxy and cyclic carbonate groups can be introduced by the capping of the live isocyanate group with a hydroxy alkene, followed by additional reactions as described above.

In the case of some urethane oligomers, chain extension is not required. For example, the reaction of the diisocyanate hexamethylene diisocyanate (a) with hydroxy butyl carbamate (b) will result in the formation of a primary carbamate urethane oligomer.

One class of preferred polymeric compounds (a) are those having an internal isocyanurate ring. For example, the isocyanurates of diisocyanates such as isophorone diisocyanate (IPDI) and hexamethylene diisocyanate (HDI) are preferred. In particular, the trimer of IPDI is a most preferred polymeric compound (a). In this case, the required functional groups (i) are the terminal or end-capping isocyanate (homopolymer) groups. While the pure isocyanurates of diisocyanates are preferred, it should be recognized most commercial sources of isocyanurates also contain additional homopolymers of the diisocyanate and are suitable for use herein.

Monomeric compounds (b) suitable for use in the instant invention will be of the formula:

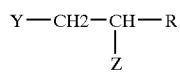

wherein Y and Z are selected from the group consisting of an active hydrogen containing group and a primary carbamate group, Y and Z may not be the same, R is of the formula: —(L)$_n$—R' wherein L is a linking group of one or more carbons containing heteroatoms selected from the group consisting of O, N, and mixtures thereof, R' is an alkyl group free of heteroatoms and selected from the group consisting of branched alkyl groups having from 5 to 30 carbons, straight chain alkyl groups of more than 2 carbons, and mixtures thereof, and n is a number from 0 to 1.

One of Y or Z must be a primary carbamate group having the structure:

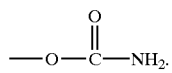

Thus, the primary carbamate group of the invention may be defined as a terminal or pendent carbamate group. Although compounds suitable for use as monomeric compound (b) may comprise more than one primary carbamate group, i.e., as part of linking group L, discussed below, it is most preferred that such compounds have one primary carbamate group.

It will be appreciated by those of skill in the art that the interchangability of Y and Z reflect the possible isomers of monomeric compound (b).

Whichever of Y and Z is not carbamate will be an active hydrogen containing group which is β to the required primary carbamate group. Examples of active hydrogen groups are hydroxyl groups, acid groups, amino groups, thiol groups, hydrazine groups, activated methylene groups, and the like. Preferrably, whichever of Y and Z is not carbamate will be hydroxyl, acid or amino, with hydroxyl being most preferred.

Substituent R will be of the formula —(L)$_n$—R'. Because n may be 1 or 0, linking group L is not required in some embodiments of the invention. However, n is most preferably 1, making linking group L a most preferred aspect of monomeric component (b). L is a linking group of one or more carbons containing heteroatoms selected from the group consisting of O, N, and mixtures thereof. Linking groups L containing O and or N are preferred. Such heteratoms may be present in linking group L in the form of heteratom containing groups such as esters, urethanes (secondary carbamates), ureas, ether, carboxyls, mixtures thereof and the like. Preferred heteratom containing groups are esters, urethanes, and mixtures thereof. In a particularly preferred embodiment, linking group L will comprise at least one ester group. Most prefereably, L will be a single ester group, i.e., —(COO)—.

R' is an alkyl group free of heteroatoms which is selected from the group consisting of branched alkyl groups having from 5 to 30 carbons, straight chain alkyl groups of more than 2 carbons, and mixtures thereof. In addition R' will be substantially free of any group reactive with functional group (i) of polymeric compound (a).

As used herein, the term "branched" refers to both lateral branches and forked branches. Lateral refers to a branch of two small chains at the end atom of a carbon chain. Forked refers to a branch of two small chains in the middle of a carbon chain. For the purposes of the instant invention a carbon chain may be from 1 to 15 carbons, more preferably from 1 to 8 and most preferably from 1 to 3. The total number of carbon atoms in the branched alkyl group is obtained by adding the total number of carbons in the main carbon chain + the number of carbons in all alkyl chains extending from the main carbon chain.

It will be appreciated that the main carbon chain may be from 1 to 25 carbons, preferably from 1 to 10, most preferably from 1 to 4. Most preferably, the main chain will be an aliphatic carbon chain free of unsaturation. Although the at least one branched alkyl group may comprise from 5 to 30 total carbons, more preferably, it will have from 5 to 15 carbons and most preferably from 8 to 12 carbons.

An example of an especially suitable at least one branched alkyl group for use as R' is

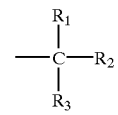

wherein R$_1$, R$_2$, and R$_3$ are alkyl groups of from 1 to 10 carbons each, preferably aliphatic groups of from 1 to 10 carbons. Most preferably, R$_1$, R$_2$, and R$_3$ will total from 8 to 12 carbons with at least one of R$_1$, R$_2$, and R$_3$ being a methyl group.

In another suitable branched alkyl group of the same structure, one of R$_1$, R$_2$, and R$_3$, may be hydrogen, with the other substituent groups being alkyl groups of from 1–10 carbons, preferably aliphatic groups of from 1 to 10. An example of such a group is

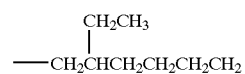

In this instance, the above structure is understood to be an example of lateral branching.

In a particularly preferred embodiment, the at least one branched alkyl group will comprise

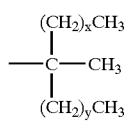

wherein x+y=5 carbons.

Alternatively, R' may be a straight chain alkyl group of more than 2 carbons, preferably more than 5 carbons, most particularly more than 10 carbons and most preferably more than 18. "Straight" as used in this context refers to unbranched carbons chains. Examples of suitable straight chain, aliphatic alkyl groups include ethyl, propyl, butyl, 1-eicosanyl, 1-octadecyl, 1-arachidyl, 1-dodecyl, 1-decyl, and 1-octyl, and the like.

Preferred R' groups are straight chains alkyl groups of from 2 to 6 carbons, especially 2 to 4 carbons, and branched alkyl groups.

In a most preferred embodiment, compounds suitable for use as monomeric compound (b) will include at least one group which is a branched alkyl group such as described above.

Monomeric compound (b) will generally have a number average molecular weight of 131–2000, and preferably from 131–1000 and most preferably from 131 to 500.

Examples of suitable monomeric compounds (b) are hydroxy butyl carbamate, hydroxy pentyl carbamate, and hydroxy octyl carbamate, as well as the reactive additive (C) disclosed in pending U.S. patent application Ser. No. 09/464,309, commonly assigned hereto, the latter being a most preferred monomeric compound (b).

Particularly suitable compounds for use as monomeric compound (b) are those having the formula:

wherein X is a branched alkyl radical of from 5 to 30 total carbons, more preferably from 5 to 15 total carbons and most preferably from 8 to 12 total carbons.
A more preferred compound for use as monomeric compound (b) is that having the formula:

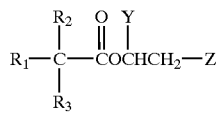

wherein $R_1$, $R_2$, and $R_3$ are each alkyl groups of from 1 to 10 carbons, especially compounds wherein $R_1$, $R_2$, and $R_3$ total from 8 to 12 carbons with at least one of $R_1$, $R_2$, and $R_3$ being a methyl group.

The most preferred compound for use as monomeric compound (b) is that having the formula:

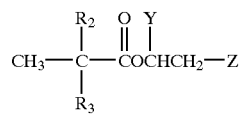

wherein $R_2$ and $R_3$ are respectively —$(CH_2)_xCH_3$ and —$(CH_2)_yCH_3$ wherein x+y=5.

Such preferred monomeric compounds (b) can be made by providing a compound having at least one epoxy group and at least one alkyl group selected from the group consisting of branched alkyl groups of from 5 to 30 total carbons, straight chain alkyl groups of more than 10 carbons, and mixtures thereof. It is prefered that the compound provided will comprise at lest one branched alkyl group of from 5 to 30 total carbons. More preferably the epoxy functional compound will have one epoxy group and a branched alkyl group of from 5 to 15 total carbons and most preferably from 8 to 12 total carbons.

Examples of preferred epoxy functional/branched alkyl group containing compounds are glycidyl ethers, glycidyl esters, and epoxies based on alpha olefins, 2-ethyl hexyl glycidyl ether, and glycidyl esters of the formula:

wherein X is a branched alkyl hydrocarbon radical containing from about 5 to 30 total carbons. More preferably, X is a tertiary aliphatic group of from about 5 to 15 carbons and most preferably from 8 to 12 carbons, such as neopentanoate, neoheptanoate, and neodecanoate. Glycidyl esters of commerically available mixtures of tertiary aliphatic carboxylic acids such as those available from Shell Chemical Company as VERSATIC ACID 911 are particularly preferred as the epoxy group and branched alkyl group containing compound. The glycidyl esters are commercially available from Shell Chemical Company as CARDURA E or GLYDEXX N-10 from Exxon Chemical Company.

The epoxy group and branched alkyl group containing compound is then reacted with carbon dioxide so as to produce a carbonate functional compound. A ring opening catalyst such as triphenyl phosphene or tertiary ammonium salt is normally employed. While the reaction will go under atmospheric pressure, positive pressures are usually used to reduce reaction time.

The resulting carbonate functional compound is subsequently reacted with ammonia or ammonium hydroxide to provide a primary carbamate functional reactive additive of the invention.

Alternatively, rather than produce a carbonate functional compound, the epoxy could be reacted with water to form alcohols, with subsequent coversion of the alcohols into carbamates via transesterification, urea decomposition and the like.

In a second method, glycol diols having the same structures of the epoxy functional compounds listed above can be used as a starting material. Such glycol diols must have at least one alkyl group selected from the group consisting of branched alkyl groups of from 5 to 30 total carbons, straight chain alkyl groups of more than 10 carbons, and mixtures thereof Glycol diol as used herein refers to a diol wherein the two hydroxy groups are on adjacent carbons. Suitable glycol diols may contain other heteroatom groups as discussed above.

The glycol diols are reacted with phosgene or similar materials such as triphosgene. The resulting cyclic carbonate is then reacted as described above to form the primary carbamate functional reactive additive.

Finally, the glycol diols can be directly converted into primary carbamates using techniques such as reaction with urea, HNCO gas, or transestrification with carbamate ester such as methyl carbamate.

The relative amounts of polymeric compound (a) and monomeric compound (b) can be adjusted to achieve a desired level of carbamate functionality polymer of the invention with the desired $T_g$ for the particular application involved. In general, the relative levels of polymeric compound (a) to monomeric compound (b) will be adjusted so that the final primary carbamate equivalent weight will be between 201 and 1500 g/equ resin, preferably between 201 and 1000 g/equ resin, and most preferably between 201 and 750 g/equ resin.

Carbamate acrylic functional polymers of the invention will result from the polymerization reaction of a mixture of functional or a mixture of functional and non-functional acrylic, methacrylic and vinyl monomers using standard techniques. The polymerization can take place in organic medium, or it can be carried out using water as the solvent following standard emulsion polymerization techniques.

The monomeric component (b) is then attached to this polymer either before, during, or after polymerization of polymeric compound (a).

When the resultant carbamate functional polymeric compound of the invention is an oligomer, it will generally have a number average molecular weight in the range of from 200 to 1499 Daltons. When the resultant carbamate functional polymeric compound of the invention is a polymer, it will have a number average molecular weight in the range of 1501 to over 1,000,000 Daltons, preferably between 1500 and 50,000 Daltons, most preferably between 1500 and 15,000 Daltons.

As indicated above, the final carbamate functional oligomer or polymer of the invention will have a primary carbamate equivalent weight will between 201 and 1500 g/equ resin, preferably between 201 and 1000 g/equ resin, and most preferably between 201 and 750 g/equ resin.

When the carbamate functional polymers or oligomers of the invention are used in curable coating compositions, such compositions will preferably include a curing agent or crosslinker (c) that is reactive with carbamate functional polymer or oligomer of the invention. Suitable curing agents will have, on average, at least about two functional groups reactive with the carbamate functional polymer or oligomer of the invention. The functional groups of the crosslinking agent (c) maybe of more than one kind.

Useful curing agents include materials having active methylol or methylalkoxy groups, such as aminoplast crosslinking agents or phenol/formaldehyde adducts; curing agents that have isocyanate groups, particularly blocked isocyanate curing agents, curing agents that have epoxide groups, amine groups, acid groups, siloxane groups, cyclic carbonate groups, and anhydride groups; and mixtures thereof. Examples of preferred curing agent compounds include, without limitation, melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurates of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Another suitable crosslinking agent is tris(alkoxy carbonylamino)triazine (available from Cytec Industries under the tradename TACT). The curing agent may be combinations of these, particularly combinations that include aminoplast crosslinking agents. Aminoplast resins such as melamine formaldehyde resins or urea formaldehyde resins are especially preferred. Combinations of tris(alkoxy carbonylamino)triazine with a melamine formaldehyde resin and/or a blocked isocyanate curing agent are likewise suitable and desirable.

A solvent may optionally be utilized in the coating composition used in the practice of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, aprotic amine, or a combination of any of these. Examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In another preferred embodiment, the solvent is water or a mixture of water with small amounts of co-solvents.

The coating composition used in the practice of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts.

In a preferred embodiment of the invention, the solvent is present in the coating composition in an amount of from about 0.01 weight percent to about 99 weight percent, preferably from about 10 weight percent to about 60 weight percent, and more preferably from about 30 weight percent to about 50 weight percent.

Coating compositions can be coated on the article by any of a number of techniques well-known in the art. These include, for example, spray coating, dip coating, roll coating, curtain coating, and the like. For automotive body panels, spray coating is preferred.

Additional agents, for example surfactants, fillers, stabilizers, wetting agents, dispersing agents, adhesion promoters, UV absorbers, hindered amine light stabilizers, etc. may be incorporated into the coating composition. While such additives are well-known in the prior art, the amount used must be controlled to avoid adversely affecting the coating characteristics.

The coating composition according to the invention is preferably utilized in a high-gloss coating and/or as the clearcoat of a composite color-plus-clear coating. High-gloss coatings as used herein are coatings having a 20° gloss (ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

EXAMPLES

Example 1a

Preparation of a Carbamate Functional Resin According to the Invention Using a Monomeric Compound (b) Wherein n=0

A mixture of 278.1 parts of methyl isoamyl ketone, 1272.8 parts of VESTANAT® T 1890 A (a homopolymer of isophorone diisocyanate, commercially available from CreaNova of Somerset, N.J.) and 0.7 parts of dibutyl tin dilaurate were heated under an inert atmosphere to 40° C. Then 463.5 of beta hydroxy butyl carbamate (the product from the reaction of ammonia with butylene carbonate) was slowly added. During this addition, the reaction temperature was allowed to go up to 80° C. After all of the beta hydroxy butyl carbamate was in, 115.9 parts of methyl isoamyl ketone was added. The reaction was then stirred at 80° C. for 2.5 hours followed by the addition of 148.3 parts of isobutanol. The final resin had a number average molecular weight of 1738 Daltons, weight average molecular weight of 2001 Daltons, and NV of 60.7%

Example 2a

Preparation of a Carbamate Functional Resin According to the Invention Using a Monomeric Compound (b) Wherein n=1

A mixture of 254.1 parts of methyl isoamyl ketone, 254.1 parts of isophorone diisocyanate, and 0.2 parts of dibutyl tin dilaurate were heated under an inert atmosphere to 48° C. Then 680.1 parts of of the beta hydroxy carbamate of the glycidyl ester of neodecanoic acid (formed from Part 3a(i)) was added. Once all of the added the reaction mixture was heated to 90° C. Once the reaction was complete, 40 parts of isobutanol was added. The final resin had a number average molecular weight of 1157 Daltons, weight average molecular weight of 1266 Daltons and a NV of 78.0%.

Example 3a

Preparation of a Carbamate Functional Resin According to the Invention Using a Monomeric Compound (b) Wherein n=1

A mixture of 218.8 parts of methyl isoamyl ketone, 492.4 parts of VESTANAT® T 1890 A (from CreaNova) and 0.3 parts of dibutyl tin dilaurate were heated under an inert atmosphere to 60° C. Then 400 parts of the beta hydroxy carbamate of the glycidyl ester of neodecanoic acid (formed from Part 3a(i)) was added. Once all of the beta hydroxy carbonate was added the reaction mixture was heated to 90° C. and 53.4 parts of aromatic S-100 solvent was added. Once the reaction was complete 115.4 parts of isobutanol and 111.8 parts of amyl acetate was added. The final resin had a number average molecular weight of 2011 Daltons, weight average molecular weight of 3408 Daltons, and a NV of 54.6%.

Part 3a(i)

Preparation of a Monomeric Compound (b) Wherein n=1

Step One: Making the Cyclic Carbonate of the Glycidyl Ester of Neodecanoic Acid

A mixture of 16428 parts of Glydexx N-10 (the glycidyl ester of neodecanoic acid sold by Exxon Chemical Company) and 125.5 parts of tetrabutyl ammonium bromide is heated under $CO_2$ pressure (6.5 bars) to 120° C. The reaction mixture is held at 120° C. under pressure until the reaction is complete. The product mixture is then cooled and the excess carbon dioxide removed.

Step Two: Making the Beta Hydroxy Carbamate

Ammonia gas is added to a mixture of 24290 parts of the cyclic carbonate of neodecanoic acid glycidyl ester (Step one) and 16192 parts of methanol. When the ring opening of the cyclic carbonate is complete, the methanol and excess ammonia is removed by vacuum.

Part 3a(ii)

Alternative Step Two for Preparation of a Monomeric Compound (b) Wherein n=1

Step Two: Making the Beta Hydroxy Carbamate

To a solution of 200 parts of concentrated ammonium hydroxide was slowly added 700 parts of the cyclic carbonate of neodecanoic acid glycidyl ester (Step one of Part 3a(i)). Once the reaction was complete, the excess water and ammonium hydroxide was removed by vaccum distillation.

Examples 1b, 2b, and 3b

Preparation of Clearcoats According to the Invention

Clearcoats according to the invention were prepared as per the following table.

| Raw Materials | CLEARCOAT | | |
| --- | --- | --- | --- |
|  | Resin 1a | Resin 2a | Resin 3a |
| Carbamate Resin | 262.61 | 191.49 | 305.74 |
| Melamine[1] | 28.39 | 38.44 | 20.87 |
| UVA[2] | 6.32 | 6.32 | 6.32 |
| UVA[3] | 3.0 | 3.00 | 3.00 |
| Flow Agent[4] | 0.33 | 1.6 | 0.33 |
| Catalyst[5] | 12.0 | 12.00 | 12.00 |
| Solvent[6] | 10.0 | 10.00 | 10.00 |
| Solvent[7] | 14.00 | 14.00 | 14.00 |
| Solvent[8] | 78.28 | 74.69 | 13.85 |
| Actual % NV | 50.86 | 56.28 | 52.54 |
| Viscosity @#Ford Cup @ 80° F. | 35.00 | 25.00 | 34.50 |

[1]Cymel 303 HMMM
[2]Tinuvin ® 384
[3]Tinuvin ®123
[4]Byk306 (commercially available from Byk Mallinkrodt) or Lindron 22 (commercially available from Lindau Chemicals)
[5]DDBSA (commercially available as Nacure 5225)
[6]Isobutanol
[7]Exxate 1000
[8]Methyl Isoamyl Ketone Test panels for etch testing were prepared as per the following. A high solids hydroxyl functional acrylic/melamine based black solvent borne basecoat was sprayed (0.7–0.9 mils) over electrocoated steel panels. The basecoat was flased for 10 minutes at ambient temperature. Clearcoats 1a, 2a, and 3a were then sprayed over the wet basecoat to a film build of 2 mils. The clearcoats were flashed for 10 minutes at ambient and baked for 25 minutes at 270° F.

After 14 week Jacksonville etch the ratings on each panel were as follows: Clearcoat 1a received a 3 rating, Clearcoat 2a a 6, and Clearcoat 3a a 3. Ratings on a 1 to 10 scale, with 1 being the best and 10 the worst. A rating of 5–6 is considered a commercially acceptable rating. Accordingly, the clearcoats prepared according to the invention provide as good as or better etch results (relative to the prior art) at sprayable viscosities and improved solids.

We claim:

1. A curable coating composition comprising a carbamate functional polymer or oligomer comprising the polymerization reaction product between (a) a polymer or oligomer comprising a plurality of functional groups reactive with an active hydrogen group, and (b) a monomeric compound of the formula:

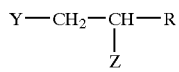

wherein at least one of Y and Z Is an active hydrogen containing group and the other is a primary carbamate group, and R is of the formula: —(L)$_n$—R' wherein L is a linking group of one or more carbons containing heteratoms selected from the group consisting of O, N, and mixtures thereof, R' is an alkyl group free of heteratoms and selected from the group consisting of branched alkyl groups having from 5 to 30 carbons, straight chain alkyl groups of more than 2 carbons, and mixtures thereof, and n is a number from 0 to 1.

2. The curable composition of claim 1 further comprising a crosslinking agent (c).

* * * * *